Dec. 6, 1955  F. MARZANO  2,725,659
TIP-UP FOR ICE FISHING
Filed June 21, 1955
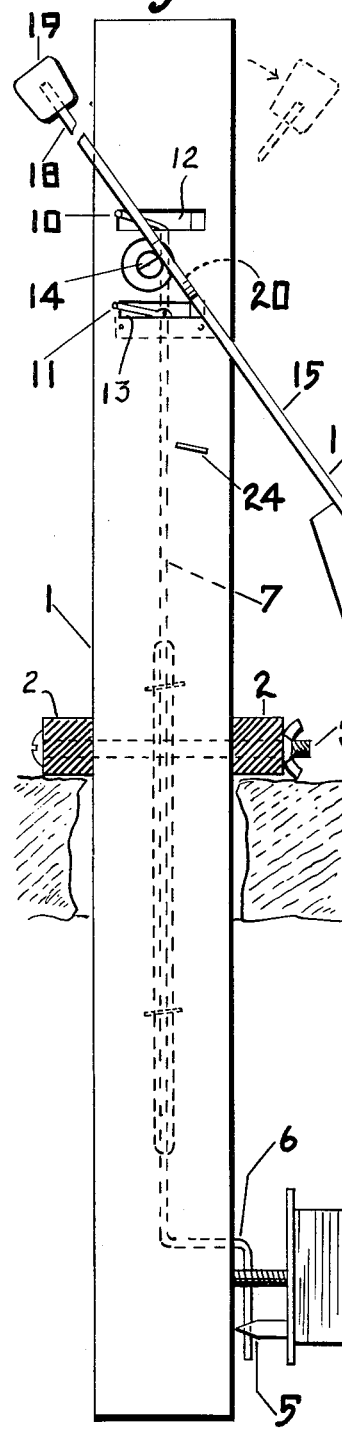
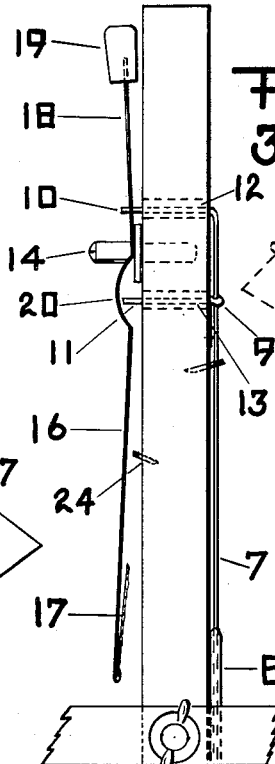
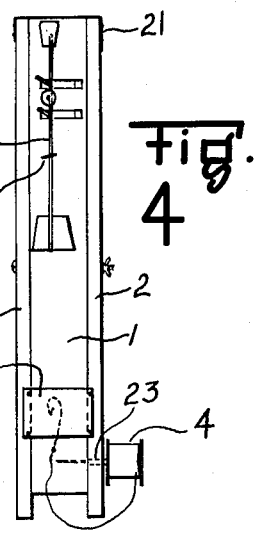
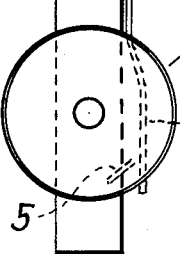
INVENTOR.
FRANK MARZANO
BY Chapin & Neal
ATTORNEYS

United States Patent Office 2,725,659
Patented Dec. 6, 1955

2,725,659
TIP-UP FOR ICE FISHING
Frank Marzano, Springfield, Mass.

Application June 21, 1955, Serial No. 516,840

2 Claims. (Cl. 43—17)

This invention relates to an improvement in tip-up signals for ice fishing.

The principal object of the invention is to provide a simplified structure, which avoids the use of springs for raising a signal when the hook is taken by a fish and in which the signal is thereafter oscillated as long as the line is being unreeled.

Other and further objects will be made apparent in the following description and claims.

In the accompanying drawing:

Fig. 1 is a front elevational view of a tip-up embodying the invention; the tip-up being in set position;

Fig. 2 is a side elevational view of the device of Fig. 1;

Fig. 3 is a fragmentary view similar to Fig. 1 showing the manner of oscillating the signal, after the latter is released; and Fig. 4 is a front elevational view on a smaller scale showing the device in folded position.

Referring to the drawing the device is shown as comprising a post 1 pivoted between side bars 2 by a bolt and wing nut as indicated at 3. As will be apparent upon loosening the wing nut the post 1 can be swung to a position at right angles to side bars 2, as shown in Figs. 1 and 4, and held in that position by tightening the wing nut. When so set up the lower end of the post may be inserted in a hole in the ice with the side bars extending over the surface of the ice, in accordance with the usual manner in which such devices are used and as shown in Fig. 1.

A line and reel of any suitable form, generally indicated at 4 is rotatably mounted at the lower end of post 1, the side of the reel being provided with a finger 5 adapted to engage an arm 6 extending from the lower end of an elongated shaft 7 which extends upwardly along the post 1. The lower portion of the shaft 7 extends through a tube 8 which may be filled with an anti-free substance to maintain free rotatability of the crank in freezing temperatures. Shaft 7 is rotatably mounted on the post in any suitable manner as by staples 7'.

The upper end of shaft 7 is provided with spaced arms 10 and 11 which extend through respective spaced slots 12 and 13 in the upper end of the post, the engagement of the ends of the slots by the arms 10 and 11 limiting the rotation of the shaft. Eccentrically pivoted at 14 between the slots 12 and 13 is a flag staff 15 provided at the end of its long arm 16 with a "flag" 17, formed of red or other brightly colored material, and at the end of its short arm 18 with a weight 19.

When the device is in a set up position as in Fig. 1 the short arm rests under the influence of weight 19 against the arm 10 of the shaft 7, the weight holding lower arm 6 in the path of finger 5 on the reel 4.

The portion 16 of the flag staff is formed with an outward bend 20 which permits the portion 16 to clear both arms 10 and 11 when the staff rotates.

With the parts in the position of Fig. 1 if a fish takes the hook and runs out the line, finger 5 engages arm 6 thus turning shaft 7 and causing arm 10 to swing the staff to the dotted line position of Fig. 1, bend 20 passing freely over arm 11. Weight 19 now causes the staff to continue to rotate clockwise, as viewed in Fig. 1, until the flag is upright as in Fig. 3, bend 20 clearing arm 10 and arm 18 engaging arm 11 to swing arm 6 again into the path of finger 5.

As the fish continues to draw out the line, finger 5 engages arm 6 at each rotation of the reel causing arm 11 to repeatedly engage and swing arm 18, thus causing the flag, now upright, to oscillate as indicated in dotted lines in Fig. 3.

If the fish just nibbles or releases itself from the hook, or if the staff is otherwise tipped up, the flag, although it moves to erect position, is not oscillated and the fisherman knows that, while the device needs to be re-set, no fish is on the line to require immediate attention.

When not in use the device, upon loosening of the wing nut 3, may be folded as shown in Fig. 5. The side bars 2 are connected at one end by a U-brace 21. Preferably and advantageously a strip of leather or similar material 22 is secured at its ends to the bars 2 adjacent reel 4 to bridge the space between the bars as shown in Fig. 4. When the parts are in collapsed condition as in Fig. 4 member 22 forms, with the adjacent face of the post 1, a pocket in which the fish hook attached to the fish line can be housed, thus permitting safe handling of the device.

The side bar 2 which is adjacent the reel 4 is notched as at 23, Fig. 4, to accommodate the reel shaft when the device is collapsed.

Also post 1 is preferably provided with a catch 24 beneath which staff 15 may be engaged when the device is not in use.

What is claimed is:

1. In a tip-up for ice fishing, a post, means to support the post upright in an opening in the ice with its lower end submerged, a fishing reel rotatably mounted on the post adjacent its lower end, a staff, a pin pivotally connecting the staff, intermediate its ends to the post adjacent the upper end thereof, a flag fixed to one end of the staff, a weight fixed to the other end of the staff and biasing the staff to an upright position with the flag end uppermost, a shaft extending longitudinally of the post and mounted thereon for limited rotation, first and second arms on said shaft, respectively, extending into the path of rotation of the staff above and below the pin, the flag carrying end portion of the staff being formed to clear both said arms in the rotation of the staff about the pivot, said first arm being engageable with the staff intermediate the weight and pivot at one side of the latter to restrain the staff from rotation, a finger extending from a side of the reel and rotatable therewtih, a third arm extending from the shaft into the path of rotation of said finger and engageable thereby upon the initial rotation of the reel to turn the shaft and cause said first arm to swing the weighted end of the staff beyond the center of the pivot to permit the weighted end to swing downwardly and swing the flag carrying end of the staff into upright position and bring the weighted portion of the staff into engagement with said second arm to be oscillated thereby upon each successive engagement of the third arm by said finger upon continued rotation of the reel.

2. A tip-up as in claim 1, wherein the shaft is mounted on the side of the post opposite the pivot, the post being formed with transverse slots through which the first and second arms extend, the ends of the slot forming the means for limiting the rotation of the shaft.

References Cited in the file of this patent
UNITED STATES PATENTS

| | | |
|---|---|---|
| 1,154,756 | Georgeson | Sept. 28, 1915 |
| 2,651,875 | Brockman | Sept. 15, 1953 |
| 2,714,270 | Premo | Aug. 2, 1955 |